Sept. 12, 1967 A. R. CLAWSON ET AL 3,341,358

FABRICATION OF MAGNETORESISTIVE SEMICONDUCTOR FILM DEVICES

Filed March 31, 1964

ARTHUR R. CLAWSON
HARRY H. WIEDER
INVENTORS

BY J. M. St. Amand

ATTORNEY

United States Patent Office 3,341,358

Patented Sept. 12, 1967

3,341,358

FABRICATION OF MAGNETORESISTIVE SEMICONDUCTOR FILM DEVICES

Arthur R. Clawson and Harry H. Wieder, Riverside, Calif., assignors to the United States of America as represented by the Secretary of the Navy Filed Mar. 31, 1964, Ser. No. 356,330
5 Claims. (Cl. 117—200)

The invention herein described may be manufactured and used by or for the Government of the United States of America for governmental purposes without the payment of any royalties thereon or therefor.

The present invention relates to semiconductors and more particularly to a method for producing a high mobility, arbitrary resistance, magnetoresistive film.

This invention relates to the phenomena of magnetoresistance in which a resistive element is sensitive to an applied magnetic field. The magnitudes of magnetoresistance and the related Hall effect in semiconductors are dependent on the carrier mobility. Presently available magnetoresistance devices are produced from high mobility semiconductors like InSb or metalloids such as Bi. The highest magnetoresistive coefficient is obtained for an InSb Corbino disc; the initial resistance of such an element is on the order of one ohm, thus limiting the scope of its application. The present invention describes a means for producing thin film InSb semiconducting elements with resistances of 10–1000 ohms that are sensitive to a magnetic field and not restricted to a Corbino disc configuration.

Previous high-resistance magnetoresistance elements have been fabricated from films of metallic bismuth. The magnetoresistance of high-mobility semiconductors is much greater, however, thus offering greater potential use.

It is an object of the invention theerfore to provide a novel method for producing high mobility, arbitrary resistance, magnetoresistive semiconductor films.

Another object of the invention is to provide a method novel for producing high mobility, arbitrary resistance, magnetoresistive semiconductor films with a predetermined current path of any desired configuration.

A further object of the invention is to provide a method for alloying indium with indium antimonide films and simultaneously causing their recrystallization to produce a sharp increase in the transverse magnetorestrictive coefficients of such films and a preferential orientation of the crystallographic (111) plane parallel to the major plane of the substrate.

Other objects and many of the attendant advantages of this invention will become readily appreciated as the same becomes better understood by reference to the following detailed description when considered in connection with the accompanying drawings wherein.

Figure 1:
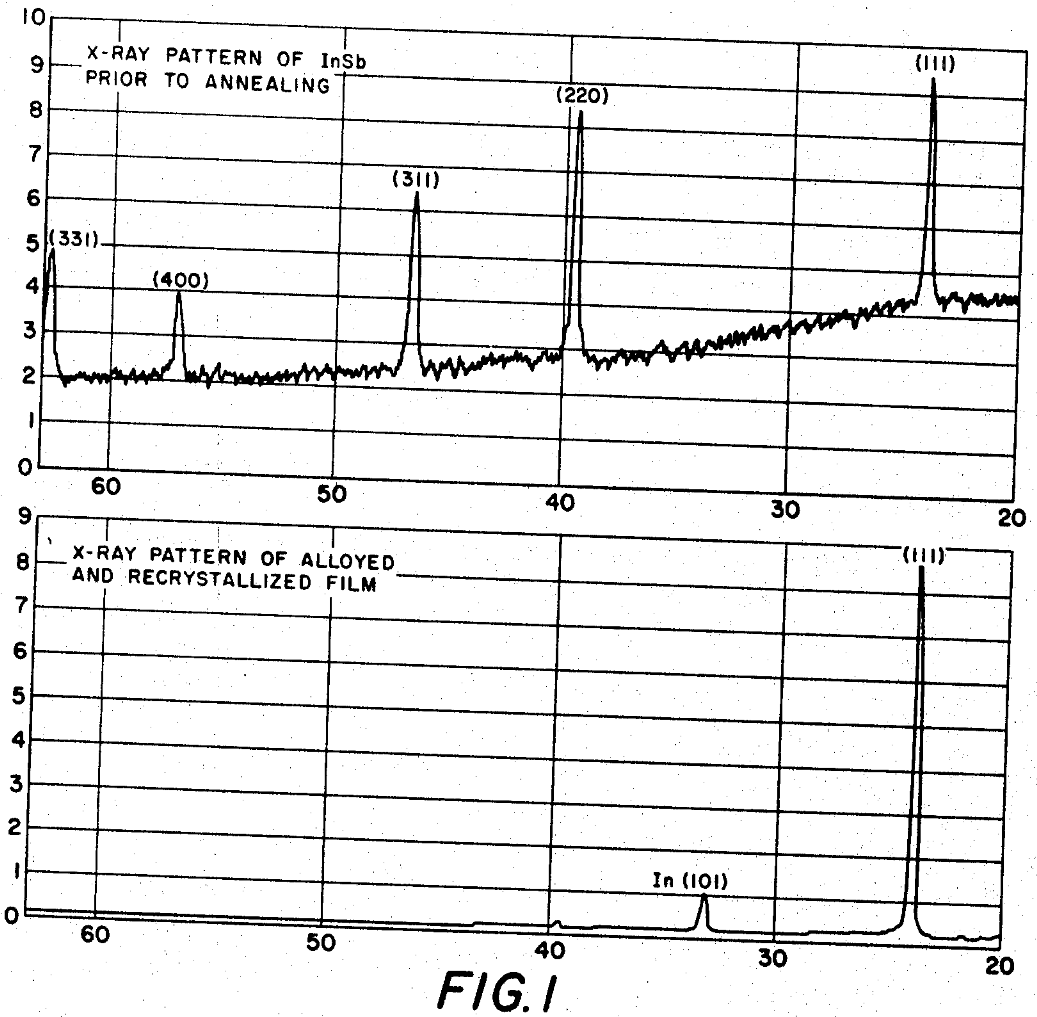
FIG. 1 shows the X-ray diffraction patterns of typical films before and after the recrystallization process.

The high magnetoresistance films of the present invention are fabricated from films of InSb, produced by vapor deposition of In and Sb from separate sources, onto a glass substrate, for example, in the manner described by K. G. Guenther, Z. Naturforsch. 13a, 1081 (1958). Such film samples ½" x ¼" of thickness less than $10^{-4}$ cm. that show apparent stoichiometry of their constituents normally have high resistance ($10^2$–$10^4$ ohms), low mobility and negligible magnetoresistance. The method hereinafter described is for improving the characteristics of these films by the introduction of excess indium and subsequent heat treatment in vacuum or inert atmosphere. A thin layer of pure indium is vapor deposited on the surface of the InSb film. The composite film is then heated in a vacuum, or preferably an inert gas atmosphere to prevent vaporization of the antimony, until the indium layer alloys with the InSb.

However, as the composite film is heated, the indium layer melts. At the temperature for the liquid phase of the InSb-In alloy, the whole film melts forming a two phase system of In in InSb. Upon recrystallization there is a segregation of the In from the InSb. The InSb forms large single crystals joined into dendrites and the In freezes at the periphery of these dendrites.

The lower melting temperature of the In-InSb alloy reduces the loss of antimony. To minimize loss of the film by vaporization and to prevent the surface tension of the liquid film from destroying the homogeneous thickness, the indium and InSb must be in a molten state only momentarily. A short heat pulse allowed the film to melt and alloy, then immediately recrystallize.

The layered film of indium and InSb was heated in vacuum just below the melting temperature of the alloy, then a low pressure jet of helium gas was admitted into the vacuum chamber. The initial effect of the helium is to momentarily increase the heat conduction between the heater and the film causing it to melt. The temperature rise is essentially a thermal transient; the helium immediately conducts the heat to the surroundings and cools the film allowing it to solidify and recrystallize. Other methods for the purpose of producing a thermal transient may be used with equal advantage.

Alloying In with InSb films and simultaneously causing their recrystallization produces a sharp increase in the transverse magnetoresistive coefficients of such films and a preferential orientation of the crystallographic (111) plane parallel to the major plane of the substrate. Large scale electrode-geometrical effects as well as Corbino effects are absent in these alloyed films. The physical change in the film occurs as an oriented recrystallization of the InSb with the (111) plane of the crystals parallel in the substrate, with the presence of free indium.

It should be noted that several attempts were made to heat InSb films and recrystallize them, without the introduction of excess indium. These attempts always resulted in the vaporization of the film. The lower melting temperature of the indium rich alloy is evidently the successful ingredient.

The change in the films due to alloying with indium by means of the above described process, is characterized by a decrease in the measured Hall voltage and resistivity. For films less than 0.5 micron thick that normally have poor mobility, there is usually a mobility increase (up to 6×) when alloyed with indium. This is due to a growth in size of the crystallites i.e., a decrease in the number of grain boundaries upon recrystallization. Films one micron or thicker which normally have a $\mu$ of $5\times10^3$ to $10^4$ cm.$^2$ (volt-sec.)$^{-1}$ undergo a smaller change in $\mu$ upon recrystallization (up to 2.5×) than low $\mu$ films. The film resistance is reduced, however, by a factor of about 10–20.

The most startling change in the film properties is an increase in $M=(\Delta r/r)$, the magnetoresistance coefficient. Films that originally had an M value of less than 1% at $5\times10^3$ oersteds exhibited at a field of 5 kilogauss, a change in resistance relative to the resistance at zero field of 100%.

The resistance after annealing and alloying with indium, appears to be a function of the initial (preanneal) resistance of the film, at least when the percentage excess indium is kept low.

The alloyed films, having large size crystallites, are quite different from normal evaporated films. One of the criteria used for determining film properties is their X-ray diffraction pattern. X-ray diffraction spectra of the recrystallized films indicate a preferred orientation of the (111) crystallographic plane parallel to the substrate, compared to the random orientation of crystallites in the virgin evaporated film. The X-ray diffraction patterns of a typical film before and after recrystallization are shown in FIG. 1. The upper X-ray pattern is that of a virgin InSb film prior to anneal processing. The lower pattern is that of the In alloyed and recrystallized film; note the large InSb (111) peak, the small (101) In peak and the absence of rest of spectrum. This preferred orientaiton was found in all the recrystallized films having an optical surface such as that shown in FIG. 2.

Figure 2:
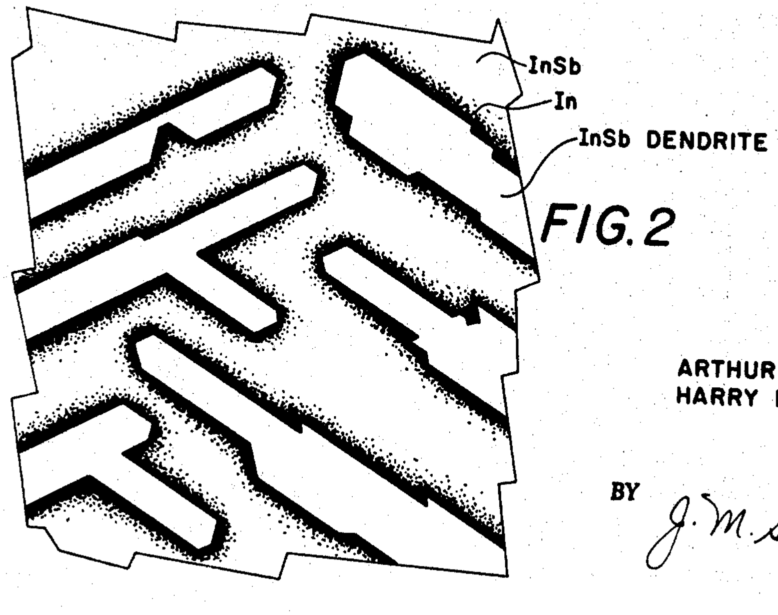
FIG. 2 is a drawing showing clearly the formation of InSb dendrites which form because of the recrystallization process.

The drawing of FIG. 2 shows on an enlarged scale the formation of InSb dendrites which form because of the recrystallization process. During recrystallization there is a continuous segregation of In across the interface between the InSb dendrite and the rest of the film. Consequently, each dendrite branch is surrounded, as shown by the shaded regions in FIG. 2, by In filaments or by heavily doped InSb with In. Both the formation of dendrites (FIG. 2) and the grain growth formed by the recrystallization process are responsible for the large magnetoresistive effect.

A further feature of this invention is the advantage of making even higher resistance field sensitive elements by increasing the length of the current path. Usual methods of doing this by use of a long narrow sample or one with a zig-zag current path made by mechanically removing positions of the film, could be used, however, the nature of the method of improving the magnetoresistance offers a simple, unique alternative. The indium coating is deposited through a mask which defines any desired current path. Upon heating the film, by the aforegoing method, only the area coated with indium transforms to the lower-resistance, field-sensitive material. The intermediate region of the film is of very high resistance and has little effect on the current path.

Test results on a shaped Hall plate from a semiconductor film made by the present invention are as follows:

Before modification:

measured mobility $\mu=1400$
measured input resistance $R_I=25{,}000\Omega$
measured Hall voltage $V_H=580\times10^{-3}$ volts at 1 ma., 5 kg.
measured magnetoresistance $(\Delta R/R_0)=<1\%$ After vacuum coating with a 600 A. indium layer and heating in helium to approximately 500° C. until the visual appearance of the film changed:

measured mobility $\mu=8500$
measured input resistance $R_I=375$ ohms
measured Hall voltage $V_H=53\times10^{-3}$ volts at 1 ma., 5 kg.
measured magnetoresistive $(\Delta R/R_0)_{5\ \mathrm{kg.}}=57\%$ Alternative methods of improving the InSb film magnetoresistance would be to introduce an excess of indium during evaporation, either in combination with the proper substrate temperature, or followed by proper heat treatment to produce a good film. Another method would be to place alternate layers of In and Sb on a substrate so there is a net excess of indium, and follow by proper heat treatment.

Obviously many modifications and variations of the present invention are possibly in the light of the above teachings. It is therefore to be understood that within the scope of the appended claims the invention may be practiced otherwise than as specifically described.

What is claimed is:

1. The method for fabricating magnetoresistive semiconductor film devices, comprising:

(a) vapor depositing a thin layer of pure indium on the surface of a thin film indium antimonide semiconductor element to form a composite layered film of indium antimonide and indium,
(b) heating said composite layered film in a vacuum chamber to just below the melting temperature of the alloy of indium antimonide with indium,
(c) admitting an inert gas into the vacuum chamber, the initial effect of which is to cause a momentary heat rise causing the indium and indium antimonide to be in a molten state only momentarily until the indium layer alloys with the indium antimonide and then immediately conduct the heat to the chamber surroundings and cool the film allowing it to solidify and recrystallize,
(d) the alloying of indium with an indium antimonide film and simultaneously causing their recrystallization producing a resultant film having a sharp increase in the transverse magnetoresistive coefficient over that of the initial indium antimonide and a preferential orientation of the crystallographic (111) plane parallel to the major plane of the semiconductor substrate.

2. A method as in claim 1 wherein said inert gas is helium.

3. The method as in claim 1 wherein the pure indium layer is deposited through a mask which defines any desired current path whereupon heating and recrystallization only the area of the indium antimonide coated with indium transforms into the improved material having an increased transverse magnetoresistive coefficient, the intermediate regions of the film being of very high resistance and having little effect on the current path.

4. The method for fabricating magnetorestive semiconductor film devices, comprising:
(a) depositing a thin layer of pure indium on the surface of a thin film indium antimonide semiconductor element to form a composite layered film of indium antimonide and indium,
(b) heating said composite layered film in a vacuum chamber to just below the melting temperature of the alloy of indium antimonide with indium,
(c) providing a short thermal transient heat pulse allowing the composite layered film to momentarily melt and alloy and then immediately recrystallize,
(d) the alloying of indium with an indium antimonide film and simultaneously causing their recrystallization producing a resultant film having a sharp increase in the transverse magnetoresistive coefficient over the initial indium antimonide and a preferential orientation of the crystallographic (111) plane parallel to the major plane of the semiconductor substrate.

5. The method as in claim 4 wherein the pure indium layer is deposited through a mask which defines any desired current path whereupon heating and recrystallization only the area of the indium antimonide coated with indium transforms into the improved material having an increased transverse magnetoresistive coefficient, the intermediate regions of the film being of very high resistance and having little effect on the current path.

References Cited

UNITED STATES PATENTS

| | | | |
|---|---|---|---|
| 2,759,861 | 8/1956 | Collins et al. | 117—107 |
| 3,101,280 | 8/1963 | Harrison et al. | 117—107 |
| 3,138,495 | 6/1964 | Bylander et al. | 117—107 |
| 3,152,022 | 10/1964 | Christensen et al. | 148—1.6 |
| 3,277,006 | 10/1966 | Johnson et al. | 148—1.6 |

ALFRED L. LEAVITT, *Primary Examiner.*

A. H. ROSENSTEIN, *Assistant Examiner.*